Sept. 21, 1954          H. G. ALLEN ET AL          2,689,589
       COMBINATION POWER SCREW DRIVER AND
              SCREW FEEDING MECHANISM
Filed Sept. 12, 1952                    2 Sheets-Sheet 2
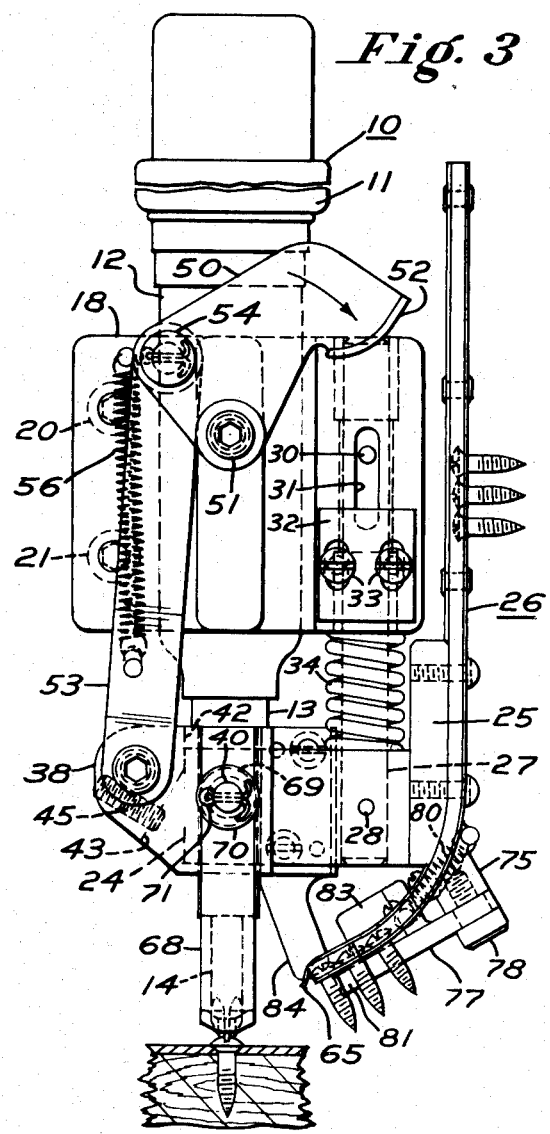
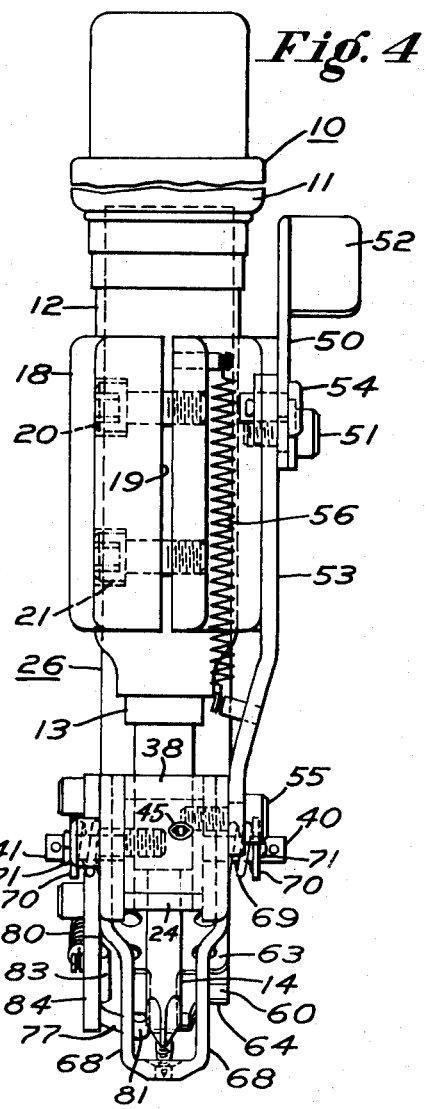
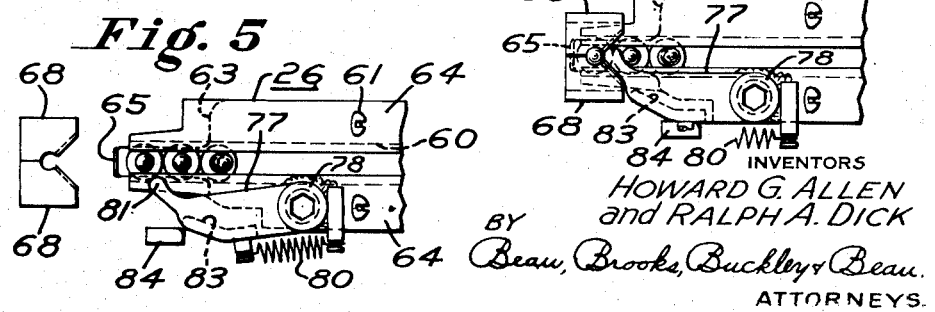
INVENTORS
HOWARD G. ALLEN
and RALPH A. DICK
BY Beau, Brooks, Buckley & Beau.
ATTORNEYS.

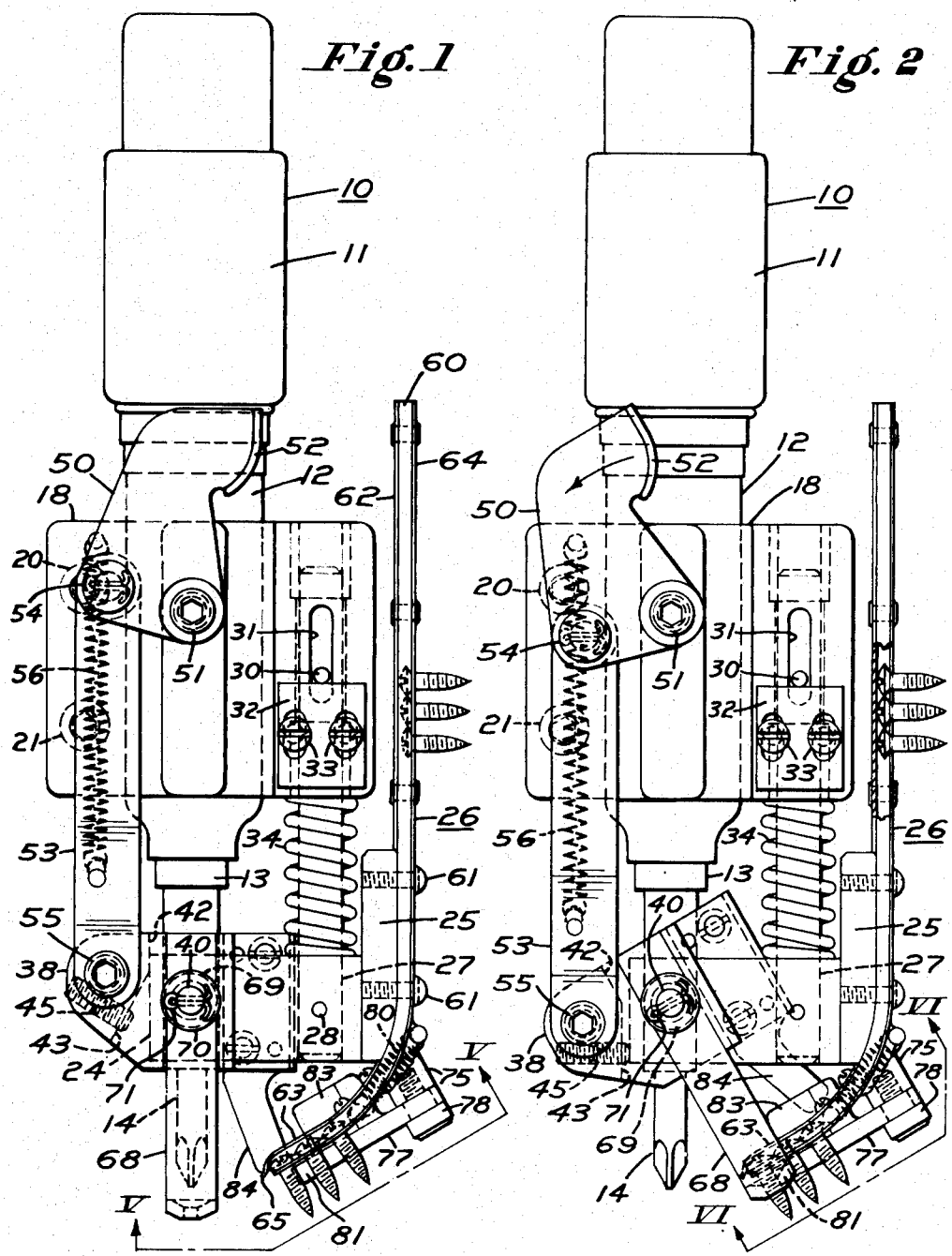

Patented Sept. 21, 1954

2,689,589

UNITED STATES PATENT OFFICE 2,689,589

COMBINATION POWER SCREW DRIVER AND SCREW FEEDING MECHANISM

Howard G. Allen, Niagara Falls, and Ralph A. Dick, East Aurora, N. Y., assignors to General Riveters, Inc., Buffalo, N. Y.

Application September 12, 1952, Serial No. 309,322

6 Claims. (Cl. 144—32)

This invention relates to feeding and delivering mechanism for screws or similar fasteners and has particular reference to a screw feeding device for association with a portable power operated screw driver.

The mechanism of the present invention is, in the instance shown herein by way of example, associated with a portable power operated screw driver of a kind which is widely used and well known in industry and wherein a pneumatic motor is incorporated in the portable screw driver assembly for rotating the screw driving bit. In portable screw drivers of this general nature it has previously been the practice, in the practical art, to place individual screws by hand in the desired position for driving and then apply to them the conventional power operated portable screw driver.

In the case of the present invention individual screws are fed into a proper driving position by semi-automatic means and the operator places the screw in proper driving position by merely directing the operating or driving end of the portable power screw driver against the opening or other location into which the screw is to be driven. Subsequent operation of the combination power screw driver and screw feeding mechanism of the present invention acts to successively apply the power screw driving bit to the screw head to move the screw outwardly of the holding and positioning instrumentalities and drive the screw into the desired assembly.

Various objects and advantages incident to use of the mechanism of the present combination will appear to those skilled in this art from a study of the following detailed specification and the accompanying drawings, which describe and illustrate a preferred embodiment of the present invention. It is to be understood, however, that such embodiment is set forth in detail by way of example only and that many mechanical modifications and changes therein may be made without departing from the principles of the present invention which are not limited in their scope excepting as defined in the appended claims.

Fig. 1 is a general elevational view of a portable power screw driver having associated therewith one form of the screw feeding mechanism of the present invention;

Fig. 2 is a view similar to Fig. 1 but showing the screw feeding and positioning mechanism in a mid-position in the screw feeding and positioning operation;

Fig. 3 is a view similar to Figs. 1 and 2 but showing the mechanism in a more advanced position of operation wherein the screw is substantially completely driven;

Fig. 4 is an elevational view of the embodiment of the invention illustrated in Figs. 1 through 3 but viewed at right angles to those views and with the parts in the position shown in Fig. 1;

Fig. 5 is a fragmentary bottom plan view of the delivery end of the screw feeding chute and the associated screw delivering instrumentalities as indicated generally by the line V—V of Fig. 1; and Fig. 6 is a view similar to Fig. 5 but with the screw delivering elements in a more advanced position of operation approximately as shown in Fig. 2 and taken as indicated generally by the line VI—VI of Fig. 2.

Like characters of reference denote like parts throughout the several figures of the drawings and the numeral 10 designates generally a conventional pneumatic power operated portable screw driver which may be of the general type shown in United States Letters Patent No. 2,099,280, dated November 16, 1937, and issued to Ernest H. Shaff. In the form of power operated screw driver with which the present mechanism is shown by way of example in the present specification and drawings, the portable screw driver comprises a pneumatic operating motor housing 11, a lower reduced body portion 12, a chuck device 13 for removably receiving various screw driving bits, and a screw driving bit 14 which in the present instance is of the type generally known as a Phillips screw driving bit.

In the form of the present invention shown herein by way of example, the screw feeding mechanism is associated with the portable power operated screw driver in such manner as to be readily removable as a unit whenever desired and includes means and an operating procedure whereby, in addition to properly feeding and positioning screws to be driven, the placement of the screw driver itself in the proper operating position prior to actually beginning the driving operation by energizing the pneumatic driving motor is greatly facilitated. Heretofore the driving operation has been preceded by the placement of the screw driving bit itself against the screw to be driven, which of course includes manually inserting the screw driving bit into the screw head, whereas in the construction of the present invention the screw to be driven is gripped in suitable means at the end of the driving mechanism in such manner that the application of the screw itself to the hole in which it is to be driven serves automatically to locate the entire portable screw driving mechanism in a proper position for beginning the driving operation, without the necessity for the operator finding the opening in the top of the screw with the end of the screw driver bit. Thus, a firm seating of the screw driving bit in the head of the screw before the beginning of the driving operation is automatically insured and slippage of the tool whereby the top of the screw is mutilated or the surrounding work is marred or damaged is entirely avoided.

The screw feeding and positioning mechanism comprises a main mounting block 18 which has a central longitudinal bore fitting over the intermediate body portion 12 of the power screw driver and block 18 is split along one side as shown at 19 in Fig. 4. A pair of screws 20 and 21 engage the opposed split portions of block 18 and are adapted to clamp the latter securely with respect to the body of the screw driving tool proper.

A lower block 24 is bored to fit loosely over the shank portion of the screw driver bit 14 and extends to the right as viewed in Fig. 1 and terminates in an upstanding pad or plate-like member 25 to which is secured a generally vertical rivet chute designated generally 26. The lower end of a guide pin 27 is fixed to block 24 as by being pinned thereto as at 28 in Fig. 1 and the upper end of guide pin 27 extends slidably into a bore formed in stationary block 18. The upper end of pin 27 carries a cross pin 30 which extends into a slot 31 formed in block 18, thus limiting the vertical sliding movement of guide pin 27 in the bore formed therefor in block 18.

A plate 32 is adjustably fixed to block 18 as shown in Fig. 1, screws 33 being provided for securing plate 32 to block 18 and plate 32 being formed with vertical slots for receiving the screws 33 to adjustably position the plate 32 vertically relative to block 18. The upper edge of plate 32 in effect forms an adjustable lower limit for slot 31 so that downward movement of guide pin 27, as viewed in Fig. 1, is adjustably limited by engagement of cross pin 30 with the upper edge of plate 32. Block 24 is normally urged to a downward limit position, as illustrated in Fig. 1, by a compression coil spring 34 which is positioned about the mid-portion of pin 27 and acts between the lower face of stationary block 18 and the upper face of vertically sliding block 24.

A clevis block 38 is bifurcated at its right-hand end as viewed in Figs. 1 through 3 to extend about the left-hand portion of block 24 which in turn extends about the shank portion of the screw driving bit 14. Clevis block 38 is mounted for pivotal movement upon a pair of trunnion pins 40 and 41 which in the present instance are formed integrally with block 24 and extend outwardly therefrom as shown in Fig. 4, for pivotal engagement with the bifurcated portion of clevis block 38.

It will be noted by reference to Fig. 1 that pivotal movement of clevis block 38 in a clockwise direction is positively limited by a shoulder or face 42 which forms a portion of the inner end of the bifurcated portion of clevis block 38. This shoulder or face 42 abuts against the left-hand end of block 24 when clevis block 38 is in its most extreme clockwise position as shown in Figs. 1 and 3. A further shoulder or face 43 which forms the remainder of the inner end of the bifurcated portion of clevis block 38 is provided with an adjustable abutment screw 45 whose end portion abuts the left-hand end of block 24 when the clevis block 38 is moved to a counterclockwise limit of its pivotal movement as illustrated in Fig. 2.

Pivotal movement of clevis block 38, as well as vertical sliding movement of the entire assembly comprising vertically slidable block 24 and the clevis block 38 which is pivotally carried thereby, is under the control of an operating lever 50 which is pivotally mounted against stationary block 18 and includes a thumb or similar manipulating portion 52. A vertical connecting link 53 is pivoted at its upper and lower ends to the operating lever 50 and clevis block 38 as at 54 and 55, respectively.

An extension coil spring 56 is connected at its upper end to stationary block 18 and at its lower end to link 53 and serves to normally retain clevis block 38 in its clockwise limit of pivotal movement, but since compression coil spring 34 is relatively stronger or provided with greater initial tension than the extension coil spring 56, the normal rest positions of vertically sliding block 24 and the parts carried thereby are in an extreme downward position, all as illustrated in Fig. 1. Thus, the position of the parts illustrated in Fig. 1 is the rest position of the parts when operating lever 50 is not being forcibly manipulated out of the idle or neutral position illustrated in Fig. 1.

The mechanism for feeding screws and for delivering them successively to the screw driver bit for driving will now be described. The generally vertical screw feeding chute has been designated generally 26 and comprises a pair of spaced rails 60 which are fixed to the chute support pad or plate 25 by screws 61 or the like. The lower end of chute 26 is arcuate as shown and the rails are provided with upper and lower backing plates 62 and 63 which, together with pad or plate 25, make up a solid backing for the chute. Flange members 64 are fixed to the outer faces of rails 60 so that the rails 60, the backing plates 62 and 63, and the flanges 64 form, in effect, a C-shaped track whereby the screw heads feed downwardly within the chute with the shank portions of the screws protruding as clearly indicated in Figs. 1 through 3 of the drawings.

The lower extremity of lower backing plate 63 is bent partially across the lower end of the chute 26 as at 65 to normally prevent the screws from falling from the lower end of the chute, but this formation 65 is resilient so that screws may be forcibly moved outwardly from the lower end of the chute against the resistance of formation 65.

A pair of generally vertical jaw members 68 have upwardly extending flat plate portions which seat in generally vertical grooves in the opposite sides of clevis block 38 and are normally held seated in such grooves by compression coil springs 69. As shown in Fig. 4, the springs 69 are disposed about the trunnion pins 40 and 41 and are held to bear against the outer faces of the upper flat portion of the jaw members 68 by washers 70 and cotter pins 71 or in any desired manner. The jaw members 68 are provided with apertures which fit loosely over the trunnion pins 40 and 41 so that their lower jaw portions may be spread laterally against the resilient resistance of the springs 69 upon the exertion of sufficient lateral force to spread the lower portions of the jaw members 68 apart.

The lower ends of the jaw members 68 are bent toward each other and normally abut as shown in Fig. 4. The formation or shape of the lower ends of the jaw members is best shown in Figs. 5 and 6 and, as there shown, the lower portions of these jaw members 68 are chamfered at one side to provide a V-shaped entry passage which terminates inwardly in a circular portion formed partly in each of the complementary lower portions of the jaw members 68.

A bearing lug 75 is fixed to the underside of the lower curved portion of chute 26 and pivotally supports a screw delivery locking pawl 77 which is pivotally attached thereto by means of a screw 78. Pawl 77 normally occupies a position as illustrated in Fig. 5 where it is entirely clear of the screw feed track of chute 26 and is held in such position by a light extension coil spring 80 which is attached at one end to pawl 77 and at its other to a stationary portion of the feed chute 26. Pawl 77 is provided with a rounded nose portion 81 which is adapted to move between the lowermost screw in chute 26 and the next succeeding screw in a manner and for a purpose which will presently appear when a cycle of operation of the mechanism is described.

Pawl 77 is provided with an angularly extending upstanding cam plate formation 83 and a camming arm 84 extends downwardly from one of the bifurcated ends of clevis block 38. In the normal rest position illustrated in Figs. 1 and 5 the camming arm 84 is clear of the cam plate 83 of pawl 77 but when clevis block 38 is pivoted in a counterclockwise direction as shown in Fig. 2, to extract a screw from the feed chute for delivery to the driving mechanism, camming arm 84 swings into engagement with cam plate 83 and moves locking pawl 77 to the position illustrated in Fig. 6 where its rounded nose portion 81 projects between the shank of the lowermost screw and the next succeeding screw to back up the former and prevent any retrograde movement thereof in chute 26. The final portion of this same swinging movement of clevis block 38 projects the lower meeting portions of the jaws 68 over the shank of the lowermost screw in chute 26, the jaws moving apart resiliently sufficiently to snap over the shank portion of such lowermost screw and resiliently grip the same.

When an operator begins the operation of feeding, positioning and driving a screw, the parts are in the position illustrated in Fig. 1 and the first step on the part of the operator is to manually move operating lever 50 in a counterclockwise direction to the position illustrated in Fig. 2, which movement swings clevis block 38 to the position likewise illustrated in Fig. 2. It will be noted that in this phase of the operation the vertically sliding block 24 is in its lowermost position of movement with pin 30 against stop plate 32, so that no movement other than the swinging of the clevis block 38 can result from this manipulation of operating lever 50. This manipulation causes the locking pawl 77 to come into engagement in the feed track as shown in Fig. 6 and causes the lower meeting ends of the screw transfer jaws 68 to engage the shank of a screw as shown in Fig. 6 and as just described.

The operator then releases operating lever 50 and spring 56 returns the clevis block 38 to its vertical position wherein shoulder 42 thereof again abuts the left-hand end of vertically sliding block 24, and a screw is then held between the lower ends of the jaws 68 in a position coaxial with the screw driving bit 14.

The operator then manipulates the operating lever 50 in a clockwise direction. It will be noted at this point that the shoulder 42 of clevis block 38 prevents the latter from pivoting any further in a clockwise direction and accordingly this final manipulation of operating lever 50 causes sliding block 24 and the parts carried thereby, mainly clevis block 38 and feed chute 26, to move jointly and bodily upwardly toward the stationary block 18. This brings the operating end of screw driving bit 14 into engagement with the head of the screw held between the lower ends of jaws 68 and continued further clockwise movement of operating lever 50 to the position illustrated in Fig. 3 causes the screw driving bit 14 to force the screw downwardly and outwardly of jaws 68.

Subsequent operation of the pneumatic driving motor for the screw driving bit 14 effectively drives the screw, this portion of the operation being the same as is effected by means of the portable pneumatic screw drivers of the prior art. After the screw is fully driven the operator merely releases operating lever 50 and the parts are automatically restored to the initial position illustrated in Fig. 1.

What is claimed is:

1. In a screw feeding and driving apparatus, a support and a rotatable screw driver projecting therefrom, a member adjacent to said screw driver and connected to said support for sliding movement in a direction parallel to the axis of said screw driver, a screw feed track carried by said sliding member and terminating at a point spaced laterally from said driver, screw transfer means pivotally attached to said sliding member and terminating outwardly in resilient screw gripping means normally alined with said screw driver but outwardly thereof, said gripping means being adapted upon pivotal movement of the transfer means to grip a screw at said feed track terminus and transfer the same to said normal alined position, and means for subsequently moving said support and said sliding member relatively toward each other to project the screw driver against the head of a screw held in said gripping means and force the screw outwardly of the gripping means during the driving operation.

2. In a screw feeding and driving apparatus, a support and a rotatable screw driver projecting therefrom, a member adjacent to said screw driver and connected to said support for sliding movement in a direction parallel to the axis of said screw driver, a screw feed track terminating at a point spaced laterally from said driver, screw transfer means pivotally attached to said sliding member and terminating outwardly in resilient screw gripping means normally alined with said screw driver but outwardly thereof, said gripping means being adapted upon pivotal movement of the transfer means to grip a screw at said feed track terminus and transfer the same to said normal alined position, and means for subsequently moving said support and said sliding member relatively toward each other to project the screw driver against the head of a screw held in said gripping means and force the screw outwardly of the gripping means during the driving operation.

3. In a screw feeding and driving apparatus, a support and a rotatable screw driver projecting therefrom, a member adjacent to said screw driver and connected to said support for sliding movement in a direction parallel to the axis of said screw driver, a screw feed track carried by said sliding member, screw transfer means operable to grip a screw at said feed track and transfer the same to a position outwardly of said screw driver and in axial alinement therewith, and means for subsequently moving said support and said sliding member relatively toward each other to project the screw driver against the head of a screw held in said gripping means and force the screw outwardly of the gripping means during the driving operation.

4. In a screw feeding and driving apparatus, a support and a rotatable screw driver projecting therefrom, a member adjacent to said screw driver and connected to said support for sliding movement in a direction parallel to the axis of said screw driver, a screw magazine carried by said sliding member, screw transfer means likewise carried by said sliding member and operable to receive a screw at said magazine and transfer the same to a position outwardly of said screw driver and in axial alinement therewith, and means for subsequently moving said support and said sliding member relatively toward each other to project the screw driver against the head of said screw and move the same outwardly of the transfer means during the driving operation.

5. In a screw feeding and driving apparatus, a support and a rotatable screw driver projecting therefrom, a screw feed track carried by said support and terminating at a point spaced laterally from said driver, screw gripping means normally in axial registry with said driver and having an inner portion pivotally attached to said support whereby said screw gripping means is swingable to said screw feed track terminus to grip a screw thereat and adapted upon return movement to dispose the screw coaxially with respect to said driver.

6. In a screw feeding and driving apparatus, a support and a rotatable screw driver projecting therefrom, a feed track carried by said support and terminating at a point spaced laterally from said driver, screw gripping means normally in axial registry with said driver and mounted for lateral movement to said feed track terminus for gripping a screw thereat and adapted upon return lateral movement to dispose the screw coaxially with respect to said driver.

References Cited in the file of this patent

UNITED STATES PATENTS

| Number | Name | Date |
|---|---|---|
| 1,984,282 | Ray | Dec. 11, 1934 |
| 2,255,827 | Snyder | Sept. 16, 1941 |
| 2,314,760 | Blair | Mar. 23, 1943 |
| 2,328,383 | Lea et al. | Aug. 31, 1943 |
| 2,374,558 | Moore | Apr. 24, 1945 |
| 2,554,732 | Doyle | May 29, 1951 |
| 2,605,792 | Havener | Aug. 5, 1952 |

FOREIGN PATENTS

| Number | Country | Date |
|---|---|---|
| 681,402 | Great Britain | Oct. 22, 1952 |